(12) United States Patent
Shibatani et al.

(10) Patent No.: US 11,478,812 B2
(45) Date of Patent: Oct. 25, 2022

(54) DROPLET DEPOSITION APPARATUS

(71) Applicant: DGSHAPE Corporation, Hamamatsu (JP)

(72) Inventors: Masaya Shibatani, Hamamatsu (JP);
Tomoyoshi Masuda, Hamamatsu (JP);
Tamaki Ogawa, Hamamatsu (JP);
Kazuhito Miyamoto, Hamamatsu (JP)

(73) Assignee: DGSHAPE Corporation, Shizuoka (JP)

( * ) Notice: Subject to any disclaimer, the term of this patent is extended or adjusted under 35 U.S.C. 154(b) by 0 days.

(21) Appl. No.: 17/614,664

(22) PCT Filed: Nov. 25, 2019

(86) PCT No.: PCT/JP2019/045943
§ 371 (c)(1),
(2) Date: Nov. 29, 2021

(87) PCT Pub. No.: WO2020/240891
PCT Pub. Date: Dec. 3, 2020

(65) Prior Publication Data
US 2022/0219191 A1  Jul. 14, 2022

(30) Foreign Application Priority Data

May 31, 2019  (JP) .............................. JP2019-102948

(51) Int. Cl.
*B41J 2/14* (2006.01)
*B05D 1/02* (2006.01)
(Continued)

(52) U.S. Cl.
CPC ........ *B05B 17/0607* (2013.01); *A61C 13/082* (2013.01); *B05B 1/08* (2013.01); *B05D 1/02* (2013.01)

(58) Field of Classification Search
CPC .............................. B41J 2/14008; B05B 1/08
See application file for complete search history.

(56) References Cited

U.S. PATENT DOCUMENTS 4,402,221 A * 9/1983 Lee .................... G10K 15/00
                                                 181/0.5
4,981,425 A * 1/1991 Lierke ................ B05B 17/0623
                                                 264/408
(Continued)

FOREIGN PATENT DOCUMENTS

CN       1785673 A    6/2006
CN     107618265 A    1/2018
(Continued)

OTHER PUBLICATIONS

Official Communication issued in International Patent Application No. PCT/JP2019/045943, dated Dec. 24, 2019.
(Continued)

*Primary Examiner* — Cachet I Proctor
(74) *Attorney, Agent, or Firm* — Keating & Bennett, LLP (57) ABSTRACT

A droplet deposition apparatus includes a standing wave generator including ultrasonic wave oscillators, a droplet supplier to supply a droplet, a workpiece retainer to retain a workpiece in a predetermined space, and a controller configured or programmed to execute causing the standing wave generator to form a standing wave in the space, causing the droplet supplier to supply the droplet to a node of the standing wave generated in the space, and bringing close to each other a predetermined position on the workpiece retained by the workpiece retainer and the node of the standing wave to which the droplet is supplied, to cause the droplet retained at the node of the standing wave to be deposited onto the workpiece.

9 Claims, 3 Drawing Sheets

(51) Int. Cl.
  B05B 17/00 (2006.01)
  B05B 17/06 (2006.01)
  A61C 13/08 (2006.01)
  B05B 1/08 (2006.01)

(56) References Cited

U.S. PATENT DOCUMENTS

| | | | | |
|---|---|---|---|---|
| 4,983,189 | A * | 1/1991 | Peterson | B01D 19/0078 366/127 |
| 5,500,493 | A * | 3/1996 | Guigne | F16C 32/00 367/191 |
| 6,003,388 | A * | 12/1999 | Oeftering | B01L 3/0241 422/417 |
| 2006/0052251 | A1* | 3/2006 | Anderson | C09K 8/03 507/103 |
| 2010/0009065 | A1 | 1/2010 | Sawada | |
| 2012/0147074 | A1 | 6/2012 | Ikeda et al. | |
| 2015/0108671 | A1* | 4/2015 | Norikane | G03G 9/0802 264/9 |
| 2016/0228991 | A1* | 8/2016 | Ryan | C22C 29/12 |
| 2017/0001439 | A1* | 1/2017 | Foresti | B29C 64/112 |
| 2019/0160813 | A1 | 5/2019 | Foresti et al. | |

FOREIGN PATENT DOCUMENTS

| | | |
|---|---|---|
| CN | 107965427 A | 4/2018 |
| CN | 107983600 A * | 5/2018 |
| JP | 04-210277 A | 7/1992 |
| JP | 2004-069470 A | 3/2004 |
| JP | 2004-069471 A | 3/2004 |
| JP | 2007-136928 A | 6/2007 |
| JP | 2014-052332 A | 3/2014 |
| JP | 2014-054130 A | 3/2014 |
| JP | 2016-163972 A | 9/2016 |
| KR | 10-2004-0065151 A | 7/2004 |
| WO | 2011/024218 A1 | 3/2011 |
| WO | 2015/110600 A1 | 7/2015 |
| WO | 2017/085613 A1 | 5/2017 |

OTHER PUBLICATIONS

Hoshi, "Could Not Help Making Do-It-Yourself Acoustic Levitation Device (2nd Report)", Entertainment Computing Symposium, Sep. 2015, pp. 100-106.
Official Communication issued in corresponding Chinese Patent Application No. 201980096718.6, dated Apr. 26, 2022.
Official Communication issued in corresponding European Patent Application No. 19930521.0, dated Jun. 30, 2022.
Vi et al., "Tasty Floats: A Contactless Food Delivery System", Proceedings of the 2017 ACM International Conference an Interactive Surfaces and Spaces, Oct. 17, 2017, pp. 161-170.

* cited by examiner

DROPLET DEPOSITION APPARATUS

CROSS REFERENCE TO RELATED APPLICATIONS

This application claims priority from Japanese Patent Application No. 2019-102948, filed with the Japan Patent Office on May 31, 2019. The entire contents of this application are incorporated herein by reference.

BACKGROUND OF THE INVENTION

1. Field of the Invention

The present invention relates to a droplet deposition apparatus.

2. Description of the Related Art

Takayuki Hoshi, "Could Not Help Making Do-It-Yourself Acoustic Levitation Device (2nd Report)", Entertainment Computing Symposium, pp. 100-106, 2015 proposes an apparatus that forms a standing wave by making use of acoustic waves to levitate a polystyrene particle at a node of the standing wave.

SUMMARY OF THE INVENTION

Dental prostheses are often colored by coloring agents that are applied by dental technicians so that a dental prosthesis is adjusted to have a color close to the color of the real tooth of each patient. In many cases, such coloring work is performed manually by a dental technician. This means that the finished color quality may vary depending on the skill of the dental technician. In addition, the coloring agents that are used in this case may often have a high viscosity, so it is difficult to apply the coloring agents with the use of such devices as inkjet nozzles, and it is difficult to apply inkjet technology for this purpose. Coloring of dental prostheses does not need as high a resolution as that required for high resolution printed matter. In the current state, the present inventors believe that it is unnecessary to make a droplet as small and precise as when the droplet is ejected by inkjet. When the size of the droplet is large, the air resistance cannot be ignored in order to eject the droplet by inkjet. Moreover, it is difficult to cause inkjet droplets to be deposited onto a base material that has surface roughness, such as a dental prosthesis, with high precision. A novel droplet deposition apparatus is proposed herein.

A preferred embodiment of a droplet deposition apparatus proposed herein includes a standing wave generator including at least one ultrasonic wave oscillator to emit an ultrasonic wave into a predetermined space, a droplet supplier to supply a droplet, a workpiece retainer to retain a workpiece in the predetermined space, and a controller configured or programmed to execute a process (A) of causing the standing wave generator to generate a standing wave in the predetermined space, a process (B) of causing the droplet supplier to supply a droplet to a node of the standing wave generated in the space, and a process (C) of bringing close to each other a predetermined position on the workpiece retained by the workpiece retainer and the node of the standing wave at which the droplet is supplied, to cause the droplet retained at the node of the standing wave to be deposited onto the workpiece.

The droplet deposition apparatus as described above is able to cause a droplet to be deposited at a predetermined position on a base material that has a surface roughness, such as a dental prosthesis. In this case, the droplet is manipulated by the standing wave generated by the ultrasonic wave oscillator. Therefore, the apparatus is able to handle a liquid having a high viscosity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, droplet deposition apparatuses according to preferred embodiments of the present invention will be described. It should be noted, however, that the preferred embodiments described herein are, of course, not intended to limit the present invention.

Figure 1:
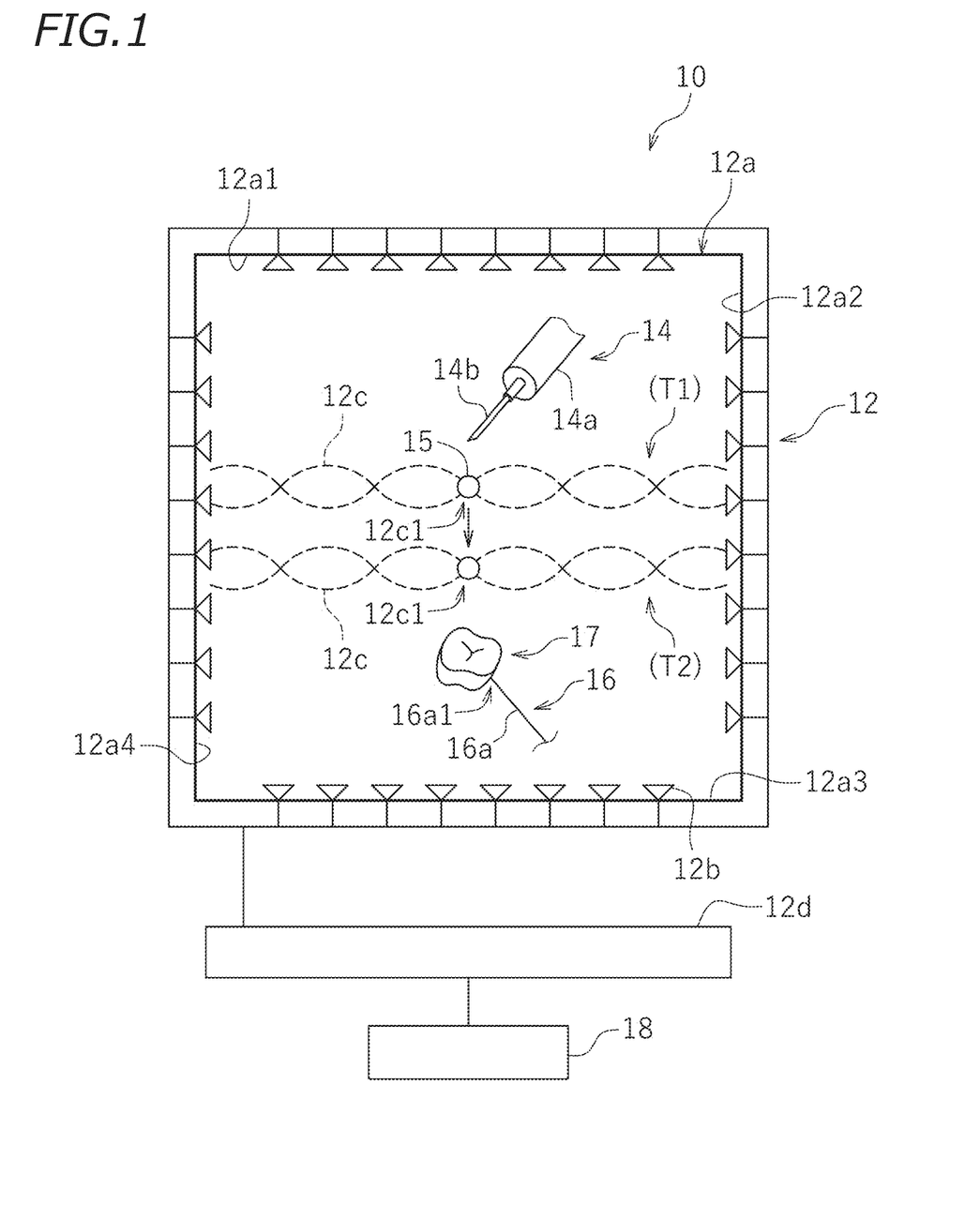
FIG. 1 is a schematic view of a droplet deposition apparatus 10 proposed herein.

FIG. 1 is a schematic view of a droplet deposition apparatus 10 proposed herein.

The droplet deposition apparatus 10 includes a standing wave generator 12, a droplet supplier 14, a workpiece retainer 16, and a controller 18.

The standing wave generator 12 includes at least one ultrasonic wave oscillator 12b configured to emit an ultrasonic wave into a predetermined space 12a. Wall surfaces 12a1 to 12a4 surround the space 12a in which a standing wave is to be generated. In this preferred embodiment, the space 12a preferably has a rectangular parallelepiped shape. In each of the wall surfaces that define the space 12a, a plurality of ultrasonic wave oscillators 12b are disposed at predetermined positions. The surface of each of the ultrasonic wave oscillators 12b that generates acoustic waves is disposed toward the inside of the space 12a so that the acoustic waves can be emitted into the space 12a. Each of the ultrasonic wave oscillators 12b may also be referred to as an ultrasonic transducer. The plurality of ultrasonic wave oscillators 12b may extend over a wall surface in a grid pattern, for example. The speaker of each of the ultrasonic wave oscillators 12b is disposed toward the space 12a. The plurality of ultrasonic wave oscillators 12b that are spread over the wall surface define a parametric speaker (also referred to as a parametric array). With such a configuration, the directivity of acoustic waves is made higher by the parametric effect, and the rectilinear propagation of acoustic waves is enhanced. In this preferred embodiment, the space 12a in which a standing wave is generated preferably has a rectangular parallelepiped shape. However, the shape of the space 12a is not limited to a rectangular parallelepiped shape. This preferred embodiment preferably uses a commercially available ultrasonic wave oscillator for the ultrasonic wave oscillator 12b. In each of the wall surfaces that surround the space 12a, a parametric speaker is provided, in which a plurality of ultrasonic wave oscillators 12b are arrayed. In this case, the ultrasonic wave oscillators 12b may be connected to an oscillator 12d so that each of the ultrasonic wave oscillators 12b can be controlled individually. In addition, the oscillator 12d may be controlled by a controller 18.

The standing wave generator 12 generates a standing wave 12c in the space 12a by emitting acoustic waves having a certain wavelength from the parametric speakers that are provided on the respective wall surfaces. A node (i.e., focal point) 12c1 of a standing wave 12c is generated at a desired position at a central portion of the space 12a. A plurality of nodes 12c1 of the standing wave 12c may be generated in the space 12a. The position of the node 12c1 of the standing wave 12c generated in the space 12a can be changed by changing the ultrasonic wave oscillator 12b that emits acoustic waves among the plurality of ultrasonic wave oscillators 12b disposed on the wall surfaces. For example, as illustrated in FIG. 1, it is assumed that a standing wave (T1) is generated in the space 12a. In this case, by changing the ultrasonic wave oscillators 12b that generate acoustic waves, the standing wave (T1) generated in the space 12a is shifted to a standing wave (T2), as shown.

Note that the configuration of the standing wave generator 12 is not limited to the preferred embodiment shown in FIG. 1. For example, the standing wave generator 12 may be able to generate the standing wave 12c in the space 12a by the ultrasonic wave oscillators 12b and also to be able to shift the position of the node 12c1 of the standing wave 12c that has been generated. From this point of view, various modifications may be made in the positions, orientations, numbers, and the like of the ultrasonic wave oscillators 12b disposed on each of the wall surfaces. For example, the wall surfaces defining the space 12a may include dented recesses, and the plurality of ultrasonic wave oscillators 12b may be arranged along the dented recesses. Moreover, any one of the plurality of wall surfaces that define the space 12a may not be provided with the ultrasonic wave oscillators 12b so that it serves as a reflection surface. Furthermore, the space 12a in which standing waves are generated may have any desired shape in addition to a rectangular parallelepiped shape. It is also possible that a plurality of standing waves 12c may be generated in the space 12a. It is also possible that a plurality of nodes 12c1 of the standing wave 12c may be generated in the space 12a. It is also possible that, for a plurality of patterns of the standing wave 12c to be generated in the space 12a, the controller 18 may store the respective positions of the nodes 12c1 of the standing waves 12c.

The droplet supplier 14 supplies a droplet. In this preferred embodiment, the droplet supplier 14 may include a syringe 14a that ejects a droplet 15. The droplet 15 may be, for example, a coloring agent for dental prostheses. In this case, the droplet 15 may be adjusted to have an appropriate color. The syringe 14a may be provided with a needle 14b having a required length and may be configured to eject the droplet 15 from a distal end of the needle 14b. In this case, the standing wave 12c generated in the space 12a is not disturbed easily, so that the droplet 15 can be easily supplied to a targeted node 12c1 of the standing wave 12c. Moreover, the syringe 14a is able to adjust the ejection amount, so the droplet 15 is adjusted to have an appropriate size. The droplet 15 may be adjusted to be, for example, in a size such that it can be kept at the node 12c1 of the standing wave 12c generated in the space 12a in a levitated state.

Here, a dental prosthesis such as zirconia is shaped by CAD/CAM and thereafter sintered. For this reason, an inorganic metal salt is used as the coloring agent. For example, a coloring agent used for such a dental prosthesis contains an inorganic metal salt for coloring, in addition to a glass component (silicate) that melts during the sintering at high temperature, such as at 1400 degrees, for example. Because such a coloring agent has a high solid content, it exhibits pseudoplastic fluidity. Herein, a desired amount of the coloring agent is ejected from the syringe 14a to form a predetermined size of the droplet. However, the droplet may not be the one used for coloring purpose. The droplet may also be, for example, a coating agent for thinly covering the entire dental prosthesis. Note that the syringe 14a may be provided with a pump to transfer a highly viscous fluid.

It should be noted that a workpiece 17 is not limited to a dental prosthesis. The droplet is not limited to a coloring agent containing an inorganic metal salt. Various types of droplets may be adopted according to the type of workpiece 17. For example, for a coloring agent containing an organic pigment, the droplet supplier 14 may also include an adjusting mechanism that adjusts the color of the coloring agent by mixing a plurality of colors of coloring agents at an appropriate ratio. In this case, for example, the droplet supplier 14 may prepare coloring agents of primary colors, such as red (R), green (G), blue (B), cyan (C), magenta (M), yellow (Y), and black (B) in advance. Then, the droplet supplier 14 may be configured so as to supply a droplet 15 in which the coloring agents of such primary colors are blended in a predetermined ratio to the node 12c1 of the standing wave 12c.

The workpiece retainer 16 retains a workpiece 17 in the space 12a in which a standing wave is to be generated. In this preferred embodiment, the workpiece retainer 16 may be configured to retain the workpiece 17 in a predetermined posture at a predetermined position within the space 12a in which a standing wave is to be generated. The workpiece 17 may be, for example, a dental prosthesis. The dental prosthesis may be, for example, a shaped product of a porous fine ceramic that is shaped in a predetermined shape. It is desirable that the surface color of such a dental prosthesis be adjusted so as to match the color of teeth of the patient. In addition, it is desirable that the workpiece retainer 16 not disturb the standing wave 12c generated in the space 12a. From such a viewpoint, the workpiece retainer 16 may include a wire rod 16a including an attachment portion 16a1 including a distal end to which the workpiece 17 is attached. In this case, because the workpiece 17 is attached to the distal end of the wire rod 16a, the standing wave 12c generated in the space 12a is unlikely to be disturbed.

The controller 18 is configured or programmed to execute a process (A), a process (B), and a process (C).

The process (A) is a process of causing the standing wave generator 12 to generate a standing wave 12c in a predetermined space 12a, as illustrated in FIG. 1.

The process (B) is a process of causing the droplet supplier 14 to supply a droplet 15 to the node 12c1 of the standing wave 12c generated in the space 12a.

The process (C) is a process of bringing close to each other a predetermined position on the workpiece 17 retained by the workpiece retainer 16 and the node 12c1 of the standing wave 12c to which the droplet 15 is supplied, to deposit the droplet 15 retained at the node 12c1 of the standing wave 12c onto the workpiece 17.

By executing these processes (A) to (C), the droplet 15 can be deposited at a predetermined position on the workpiece 17.

In this preferred embodiment, the workpiece 17 is, for example, a dental prosthesis. The droplet 15 is a coloring agent. The droplet 15 of the coloring agent can be deposited at a predetermined position on the dental prosthesis 17. Herein, in the process (B), the droplet 15 supplied by the droplet supplier may be adjusted as appropriate, for example. The dental prosthesis 17 is, for example, a shaped product of a porous fine ceramic, as described above. In this case, when the droplet 15 makes contact with the dental prosthesis 17, the droplet 15 is deposited onto the dental prosthesis 17 so as to infiltrate into the dental prosthesis 17. The coloring agent for the dental prosthesis 17 is a colloidal fluid in which an inorganic metal salt or the like is dispersed, and it shows a behavior as a pseudoplastic fluid. In this preferred embodiment, the droplet supplier 14 supplies the droplet 15 with the use of the syringe 14a, and therefore allows such a fluid that shows a behavior as a pseudoplastic fluid to be supplied in the form of the droplet 15. It should be noted that the workpiece 17 is not limited to a dental prosthesis, as already mentioned above. The droplet may not necessarily be a pseudoplastic fluid, but may be what is called a Newtonian fluid.

Thus, the standing wave generator 12 may be configured to be capable of changing the standing wave 12c generated in the space 12a. When this is the case, the process (C) may be a process of depositing the droplet 15 onto the workpiece 17 by changing the standing wave 12c generated in the space 12a. For example, as illustrated in FIG. 1, the droplet 15 is supplied to the node 12c1 of the standing wave 12c that is generated at the position (T1) in the space 12a. The ultrasonic wave oscillators 12b of the standing wave generator 12 are controlled so as to gradually shift the position of the node 12c1 of the standing wave 12c. In this process, the droplet 15 may be brought closer to the workpiece 17 while the droplet 15 is retained at the node 12c1, to cause the droplet 15 to be deposited at a predetermined position on the workpiece 17. In this case, the droplet 15 may be shifted so as to be deposited at a predetermined position on the workpiece 17 by manipulating the standing wave 12c generated in the space 12a. When the workpiece 17 is a dental prosthesis 17, it is possible to deposit the prepared coloring agent at a predetermined position on the dental prosthesis 17.

In this preferred embodiment, the pattern of the standing wave 12c generated in the space 12a is determined by changing the ultrasonic wave oscillator 12b that emits acoustic waves among the plurality of ultrasonic wave oscillators 12b of the standing wave generator 12, or by changing the acoustic wave that is emitted. The controller 18 may include a memory or storage that stores a plurality of patterns of the standing wave 12c to be generated in the space 12a. Also, the controller 18 may be configured or programmed to be able to cause the droplet 15 supplied to the node 12c1 of the standing wave 12c to move to a desired position that can be selected within the space 12a, by changing the pattern of the standing wave 12c to be generated in the space 12a.

Figure 2:
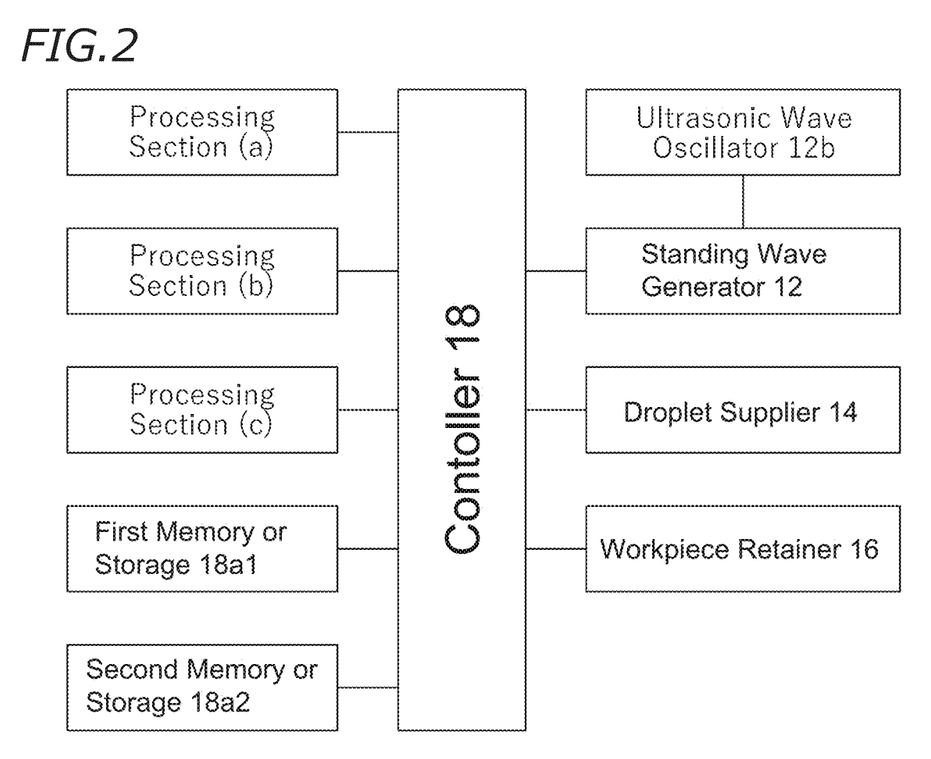
FIG. 2 illustrates an example of a block diagram of a controller 18.
Figure 3:
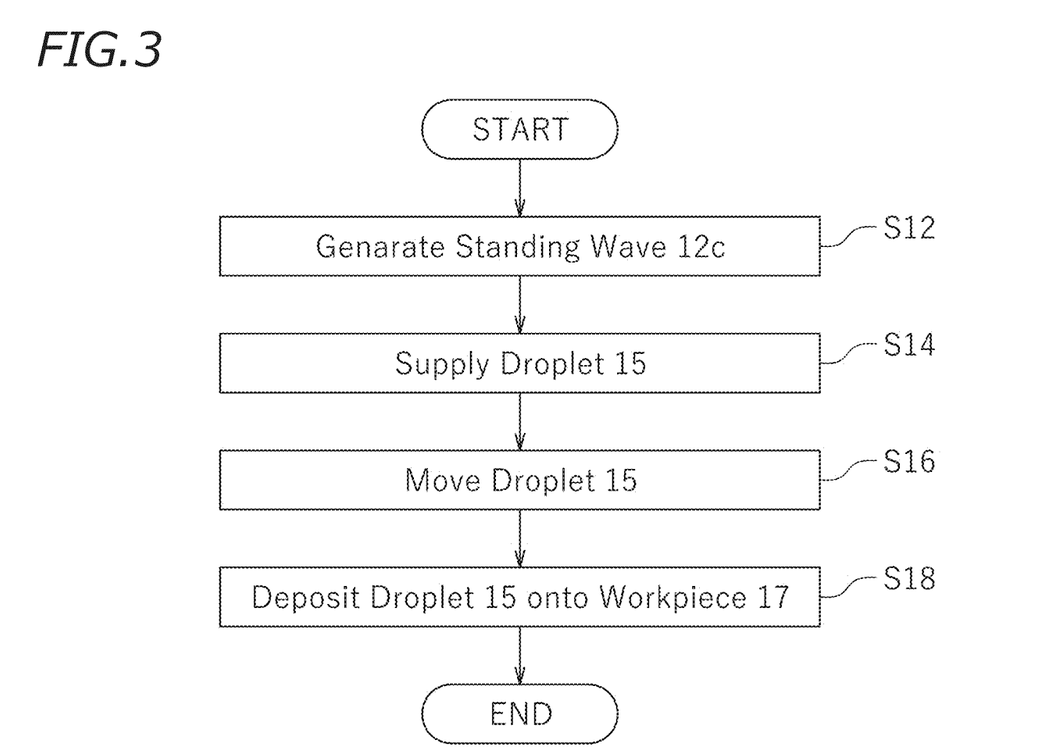
FIG. 3 is a flowchart illustrating an example of the control flow of the controller 18.

FIG. 2 illustrates an example of a block diagram of a controller 18. FIG. 3 is a flowchart illustrating an example of the control flow of the controller 18. As illustrated in FIG. 2, the controller 18 is configured or programmed to include a first memory or storage 18a1, a second memory or storage 18a2, a processing section (a), a processing section (b), and a processing section (c).

The controller 18 is a device that performs various processes for the droplet deposition apparatus 10. The controller 18 may be implemented by, for example, a computer that is operated according to a predetermined program or programs. Specifically, various functions of the controller 18 are processed by cooperative combinations of arithmetic devices (also referred to as processors, central processing units (CPUs), or micro-processing units (MPUs)) of the computers that make up the controller 18, memory storage devices (such as memories and hard disks), and software. For example, the configurations and operations of the controller 18 may be embodied as a database that stores various data embodied by a computer, a data structure, or a processing module that performs predetermined computing processes according to a predetermined program, or as part of the database, the data structure, or the processing module. The processes of the controller 18 may be executed by a single computer. Alternatively, the processes performed by the controller 18 may be executed by a plurality of computers. The processes performed by the controller may be executed by cooperative combinations of a computer incorporated in the droplet deposition apparatus 10 and an external computer. For example, it is possible that the external computer may store the information, or a portion of the information, that is to be stored in the controller 18. Alternatively, the processes to be executed by the controller 18, or a portion of the processes to be executed by the controller 18, may be executed by an external computer.

For the plurality of patterns of the standing wave 12c to be generated in the space 12a, the first memory or storage 18a1 stores the respective relationships between the patterns of the standing wave 12c and the control patterns for the ultrasonic wave oscillator 12b. Thus, the ultrasonic wave oscillators 12b are controlled based on a control pattern stored in the first memory or storage 18a1. As a result, the standing wave 12c is generated at a predetermined position in the space 12a. By changing the pattern of the standing wave 12c, it is possible to change the position of the node 12c1 of the standing wave 12c generated in the space 12a. Herein, the position at which the node 12c1 is to be generated in the space 12a may be stored as predetermined three-dimensional positional information in the space 12a. The first memory or storage 18a1 may store a plurality of patterns of the standing wave 12c so that the position of the node 12c1 of the standing wave 12c shifts substantially continuously. For example, the first memory or storage 18a1 may store a plurality of patterns of the standing wave 12c that has the node 12c1 at adjacent positions in the space 12a. For example, it is assumed that the controller 18 selects a pattern of the standing wave 12c having the node 12c1 at adjacent positions in the space 12a one after another among the plurality of patterns stored in the first memory or storage 18a1, so that standing waves 12c are generated sequentially in the space 12a. In this case, the standing wave 12c generated in the space 12a gradually changes as if the position of the node 12c1 shifts.

The second memory or storage 18a2 stores three-dimensional data of the workpiece 17 and a position at which the droplet 15 is to be deposited onto the workpiece 17. When the workpiece 17 is retained in a predetermined posture at a predetermined position in the space 12a, the controller 18 is able to obtain the positional information at which the droplet 15 is to be deposited onto the workpiece 17 based on the information stored in the second memory or storage 18a2.

The processing section (a) is configured or programmed to execute the process (A). The process (A) is a process of causing the standing wave generator 12 to generate a standing wave 12c in a predetermined space 12a. Hereinbelow, the description is made with reference to the flowchart of FIG. 3 when necessary. Herein, first, a node 12c1 of a standing wave 12c is generated at a predetermined position in the space 12a (S12). Then, the position of the node 12c1 generated in the space 12a is identified based on the pattern of the standing wave 12c that is to be generated in the space 12a.

The processing section (b) is configured or programmed to execute the process (B). The process (B) is a process of causing the droplet supplier 14 to supply a droplet 15 to the node 12c1 of the standing wave 12c generated in the space 12a. The droplet supplier 14 may supply the droplet 15 to one of nodes 12c1 that is located at a predetermined position among the plurality of nodes 12c1 generated in the space 12a (S14).

The processing section (c) is configured or programmed to execute the process (C). The process (C) is a process of bringing close to each other a predetermined position on the workpiece 17 retained by the workpiece retainer 16 and the node 12c1 of the standing wave 12c to which the droplet 15 is supplied, to cause the droplet 15 retained at the node 12c1 of the standing wave 12c to be deposited onto the workpiece 17. For example, in the process (C), the standing wave 12c generated in the space 12a is changed as if the position of the node 12c1 supplied with the droplet 15 shifts. This causes the droplet 15 retained at the node 12c1 to move (S16). Then, the droplet 15 is brought into contact with a predetermined position on the workpiece 17 that is retained in a predetermined posture at a predetermined position within the space 12a. This makes it possible to deposit the droplet 15 at the predetermined position on the workpiece 17.

In this case, the operation of causing the droplet 15 to be deposited at a predetermined position on the workpiece 17 is achieved by controlling the ultrasonic wave oscillators 12b. For this reason, it is not always necessary to provide and control an XYZ-axis mechanism and a rotation mechanism as the mechanism for causing the droplet 15 to be deposited at a predetermined position on the workpiece 17. This allows the mechanical structure of the droplet deposition apparatus 10 to be simplified. Furthermore, the droplet deposition apparatus 10 is able to manipulate the droplet 15 with the use of the standing wave 12c. This means that the droplet 15 is allowed to be moved and deposited to a predetermined position on the workpiece 17 irrespective of the viscosity of the droplet 15. As a result, the droplet deposition apparatus 10 can be applied for the purpose of depositing a liquid with a high solid content or a liquid with a high viscosity onto the workpiece 17. For example, the droplet deposition apparatus 10 can be applied for the purpose of depositing a coloring agent to a predetermined position of a dental prosthesis 17, as mentioned previously.

It is also possible, for example, to fix the position of the distal end of the needle 14b of the syringe 14a of the droplet supplier 14. When this is the case, the controller 18 causes the node 12c1 of the standing wave 12c to be generated at a predetermined position relative to the position of the distal end of the needle 14b. Next, the controller 18 may control the droplet supplier 14 so as to supply the droplet 15 to the node 12c1 at the time at which the node 12c1 is generated. Then, as illustrated in FIG. 1, the droplet 15 is moved within the space 12a by changing the position of the node 12c1 at which the droplet 15 is retained. Then, the droplet 15 is allowed to be deposited at a predetermined position on the workpiece 17. It is also possible that, while a node 12c1 retaining one droplet 15 is being moved, another node 12c1 of a standing wave 12c may be generated at a predetermined position relative to the distal end of the needle 14b so that another droplet 15 can be supplied to that position. Then, the standing wave 12c may be manipulated so that the droplets 15 can be deposited sequentially at predetermined respective positions on the workpiece 17. This enables the droplets 15 to be deposited onto the workpiece 17 one after another. When the droplets 15 are deposited onto the workpiece 17 one after another in this manner, it is possible to increase the speed of coloring operation to the workpiece 17.

Here, a preferred embodiment has been described in which the standing wave generator 12 manipulates the standing wave 12c within the space 12a to cause the droplet 15 retained at the node 12c1 of the standing wave 12c to shift to be deposited onto the workpiece 17. However, the droplet deposition apparatus 10 proposed herein is not limited to such a preferred embodiment. For example, although not shown in the drawings, the standing wave generator 12 may also include an actuator to actuate an ultrasonic wave oscillator 12b. Accordingly, the process (C) may cause the droplet 15 retained at the node 12c1 of the standing wave 12c to be deposited onto the workpiece 17 by actuating the ultrasonic wave oscillator 12b. In this case, the ultrasonic wave oscillator 12b may be configured or programmed to be able to move relative to the space 12a. As just described, it is also possible to combine a mechanical structure and control for moving the ultrasonic wave oscillator 12b together.

Furthermore, the workpiece retainer 16 may include a transfer mechanism (not shown) that transfers the workpiece 17. For example, the workpiece retainer 16 may rotate the workpiece 17 by rotating the workpiece 17 about the axis of the wire rod 16a. Alternatively, the wire rod 16a may be shifted back and forth along the axis. Such a transfer mechanism may be controlled by the controller 18. When this is the case, the workpiece 17 is moved by the transfer mechanism in the process (C). The transfer mechanism may be operated so that the predetermined position on the workpiece 17 is matched to the droplet 15 retained at the node 12c1 of the standing wave 12c by moving the workpiece 17. This allows the droplet 15 to be deposited easily at the predetermined position on the workpiece 17. For example, the dental prosthesis 17 has a complicated shape. When the transfer mechanism or the rotation mechanism for transferring the workpiece 17 is provided, the workpiece 17 can also be manipulated in addition to the droplet 15 that is retained by the standing wave 12c. This increases the degree of freedom in setting the position at which the droplet 15 of the coloring agent is to be deposited on the dental prosthesis 17. As just described, it is possible that a mechanical structure and controlling for moving the workpiece 17 may be combined together.

As described above, for the droplet deposition apparatus 10 proposed herein, the workpiece 17 may be a dental prosthesis, and the droplet 15 may be a coloring agent for dental prostheses. That is, the droplet deposition apparatus 10 may use a coloring agent for dental prostheses, which includes a pseudoplastic fluid, which is difficult to be ejected by an inkjet technique. The droplet deposition apparatus 10 is able to deposit the coloring agent in the form of droplet 15 onto a predetermined position of a dental prosthesis 17 that has an extremely complicated shape. The size and color of the droplet 15 of the coloring agent as well as the position at which the droplet 15 is deposited on the dental prosthesis 17 may be determined in advance and digitized, and the digitized data may be incorporated in the three-dimensional data of the dental prosthesis 17. The controller 18 may be configured or programmed to cause the coloring agent of a predetermined color to be deposited at a predetermined position on the dental prosthesis 17 in a predetermined amount each time, based on such three-dimensional data of the dental prosthesis 17. Such control performed by the controller 18 makes it possible to achieve delicate coloring to the dental prosthesis 17 that has a complicated shape.

A preferred embodiment of coloring to a dental prosthesis 17 has been illustrated as an example herein. However, the droplet deposition apparatus 10 is able to deposit a special liquid with a high viscosity, such as a pseudoplastic fluid, onto a predetermined position on the workpiece 17. From this viewpoint, the droplet deposition apparatus 10 may be applied to various types of applications, not just to the coloring to the dental prosthesis 17.

As described above, the present disclosure may involve, in another aspect of an example preferred embodiment of the present invention, a program to cause the controller 18 of the droplet deposition apparatus 10 to execute the following processes (A) to (C). In addition, such a program may be stored or contained in a non-transitory computer readable medium.

Herein, the processes (A) to (C) are as follows.

Process (A): causing the standing wave generator 10 to generate a standing wave in the predetermined space;

Process (B): causing the droplet supplier 12 to supply a droplet to a node of the standing wave that is generated in the space; and Process (C): bringing close to each other a predetermined position on the workpiece 17 retained by the workpiece retainer 16 and the node of the standing wave to which the droplet is supplied, to cause the droplet retained at the node of the standing wave to be deposited onto the workpiece 17.

Controlling by such a program enables the droplet deposition apparatus 10 to achieve delicate coloring to the dental prosthesis 17, which has a complicated shape.

In another aspect, the present disclosure may involve a droplet deposition method.

A droplet deposition method according to another example preferred embodiment of the present disclosure includes:

(A) forming a standing wave in a predetermined space;

(B) supplying a droplet to a node of the standing wave formed in the space; and (C) bringing close to each other a predetermined position on the workpiece 17 retained in the space and the node of the standing wave to which the droplet is supplied, to cause the droplet retained at the node of the standing wave to be deposited onto the workpiece 17.

Such a droplet deposition method makes it possible to achieve delicate coloring to the dental prosthesis 17, which has a complicated shape. Such a droplet deposition method may be implemented by a droplet deposition apparatus including a standing wave generator 12 including at least one ultrasonic wave oscillator configured to emit an ultrasonic wave into a predetermined space, a droplet supplier 14 to supply a droplet, and a workpiece retainer 16 to retain a workpiece 17 in the predetermined space, for example, as illustrated in FIG. 1.

Various preferred embodiments of the droplet deposition apparatuses proposed in this disclosure have been described hereinabove. It should be understood, however, that the droplet deposition apparatuses proposed in this disclosure is not limited to the preferred embodiments described above. It should be noted that various modifications and alterations may be made to the preferred embodiments of the droplet deposition apparatuses disclosed herein. In addition, the features, structures, or steps described herein may be omitted where appropriate, or may be combined in any suitable combinations, unless specifically stated otherwise.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A droplet deposition apparatus comprising:
   a standing wave generator including at least one ultrasonic wave oscillator to emit an ultrasonic wave into a predetermined space;
   a droplet supplier to supply a droplet;
   a workpiece retainer to retain a workpiece in the predetermined space; and
   a controller configured or programmed to execute processes (A) to (C):
   (A) causing the standing wave generator to generate a standing wave in the predetermined space;
   (B) causing the droplet supplier to supply a droplet to a node of the standing wave generated in the space; and
   (C) bringing close to each other a predetermined position on the workpiece retained by the workpiece retainer and the node of the standing wave to which the droplet is supplied, to cause the droplet retained at the node of the standing wave to be deposited onto the workpiece.

2. The droplet deposition apparatus according to claim 1, wherein:
   the standing wave generator is capable of changing the standing wave generated in the space; and
   the process (C) includes depositing the droplet onto the workpiece by changing the standing wave generated in the space.

3. The droplet deposition apparatus according to claim 1, wherein:
   the standing wave generator includes an actuator to actuate the at least one ultrasonic wave oscillator; and
   the process (C) includes depositing the droplet onto the workpiece by actuating the at least one ultrasonic wave oscillator.

4. The droplet deposition apparatus according to claim 1, wherein:
   the workpiece retainer includes a conveyor to transfer the workpiece; and
   the process (C) includes depositing the droplet onto the workpiece by transferring the workpiece using the conveyor.

5. The droplet deposition apparatus according to claim 1, wherein the workpiece retainer includes a wire rod including an attachment portion including a distal end to which the workpiece is attached.

6. The droplet deposition apparatus according to claim 1, wherein the droplet supplier includes a syringe and a needle to eject a liquid from the syringe.

7. The droplet deposition apparatus according to claim 1, wherein:
   the workpiece is a dental prosthesis; and
   the droplets include a coloring agent for dental prostheses.

8. A program for a droplet deposition apparatus comprising:
   a standing wave generator including at least one ultrasonic wave oscillator to emit an ultrasonic wave into a predetermined space;
   a droplet supplier to supply a droplet;
   a workpiece retainer to retain a workpiece in the predetermined space; and
   a controller configured or programmed to execute processes (A) to (C):
   (A) causing the standing wave generator to form a standing wave in the predetermined space;
   (B) causing the droplet supplier to supply a droplet to a node of the standing wave formed in the space; and (C) bringing close to each other a predetermined position on the workpiece retained by the workpiece retainer and the node of the standing wave to which the droplet is supplied, to cause the droplet retained at the node of the standing wave to be deposited onto the workpiece.

9. A droplet deposition method comprising:
(A) forming a standing wave in a predetermined space;
(B) supplying a droplet to a node of the standing wave formed in the space; and
(C) bringing close to each other a predetermined position of a workpiece retained in the space and the node of the standing wave to which the droplet is supplied, to cause the droplet retained at the node of the standing wave to be deposited onto the workpiece.

* * * * *